United States Patent [19]
Morris

[11] Patent Number: 5,246,027
[45] Date of Patent: Sep. 21, 1993

[54] CARGO TANK RELIEF VALVE WITH SUDDEN SURGE PROTECTION

[75] Inventor: Carrol V. Morris, Cosby, Mo.

[73] Assignee: Clay and Bailey Manufacturing Company, Kansas City, Mo.

[21] Appl. No.: 884,645

[22] Filed: May 15, 1992

[51] Int. Cl.⁵ .............................................. F16K 17/04
[52] U.S. Cl. ..................... 137/43; 137/494; 220/203
[58] Field of Search ............... 137/38, 39, 43, 494; 220/203

[56] References Cited

U.S. PATENT DOCUMENTS

| | | | |
|---|---|---|---|
| 4,587,988 | 5/1986 | Schulte | 137/494 X |
| 5,048,553 | 9/1991 | Vandevyver | 137/43 |

*Primary Examiner*—Robert G. Nilson
*Attorney, Agent, or Firm*—Hovey, Williams, Timmons & Collins

[57] ABSTRACT

The relief valve assembly has a spring-loaded poppet valve that vents the interior of a transport tanker to the atmosphere when gaseous pressure within the tank exceeds a predetermined limit. Sudden surge protection from a pressure spike created by liquid within the tank during the instant that the tank strikes the ground during accidental roll over is provided to keep the poppet valve closed during the surge condition. A reaction piston having one face that counteracts the face of the poppet valve is exposed to pressure within the tank simultaneously with the poppet valve, but the counteracting effect of that surface is normally overcome by a neutralizing chamber on the opposite side of the reaction piston which is likewise exposed to the interior of the tank. While gaseous pressure can reach all working surfaces of the valve essentially at the same time during gradual, progressive pressure buildup, in a sudden surge situation the liquid is restricted by port means from instantaneously entering the neutralizing chamber so that the reaction piston instead holds the poppet closed at this time. Once the initial liquid surge has passed, pressure within the tank can gradually enter the neutralizing chamber to allow the poppet valve to open in the usual manner if pressure exceeds the predetermined limit.

27 Claims, 4 Drawing Sheets

CARGO TANK RELIEF VALVE WITH SUDDEN SURGE PROTECTION

TECHNICAL FIELD

This invention relates to pressure relief valves utilized in connection with over-the-road tanker trucks and the like and, more particularly, to a relief valve which permits venting to the atmosphere when the interior of the tank exceeds a predetermined pressure level yet which has built-in sudden surge protection to at least substantially prevent opening of the relief valve in response to a sudden liquid pressure surge during accidental roll-over of the tanker.

BACKGROUND ART

Cargo tanks which handle volatile liquids must be provided with relief valves to permit the interior of the tank to be vented to the atmosphere if the pressure inside of the tank increases to an excessive level due to heat exposure, for example. However, in the event the tank is rolled over during a vehicular accident, it is desirable that the relief valve not be allowed to open during the instant that a high pressure, sudden liquid surge arises within the tank as it strikes the ground. If the valve were allowed to open at that time, the surging liquid could spray and spew the volatile contents over a wide area in the vicinity of the rollover and present a very dangerous situation. On the other hand, once the sudden liquid surge has passed, it is important that the relief valve then be capable of performing its venting function so that the pressure within the tank can be gradually released if it exceeds the relief pressure for any prolonged period of time.

SUMMARY OF THE PRESENT INVENTION

Accordingly, one important object of the present invention is to provide a cargo tank relief valve which is capable of venting the interior of the tank to the atmosphere when inside pressure exceeds a certain predetermined level, yet which is also capable of remaining at least substantially fully closed during the instant that a sudden liquid pressure surge is encountered within the tank during rollover. As an extension to this objective, it is also an important aspect of the invention to provide for opening of the relief valve even when the tank is in the rollover condition once the sudden surge has passed and if the continuing pressure exerted by the contents then exceeds the preset relief pressure of the valve.

Another important object of the present invention is to make the sudden surge protection portion of the relief valve directly responsive to pressure levels within the tank, rather than indirectly responsive through the use of pilot-operated, intermediate moving components and springs such as sometimes utilized in prior art devices. In this respect, it is also important that the sudden surge portion of the valve be pressure-responsive rather than gravity actuated in contrast to certain prior art arrangements so that reliability is increased.

In carrying out the foregoing and other objects, the present invention contemplates a relief valve having a spring loaded poppet that is designed to move against the contrary urging of a biasing spring when pressure within the tank exceeds a predetermined level so that the poppet is opened to allow venting of the pressurized vapors to the atmosphere. In order to prevent the poppet valve from responding in the same manner to a sudden pressure spike or surge from the contained liquid during rollover, the poppet valve is provided with a special reaction piston having a working surface that faces in the opposite direction from the corresponding surface of the poppet valve and which is exposed to either the pressurized gaseous vapors or sudden liquid surge at the same time as the poppet valve. Thus, the working surface of the reaction piston tends to counteract the force tending to open the poppet valve. However, the underside of the reaction piston is also exposed to the pressurized gaseous vapors in the tank at the same time as the other working surfaces so that during normal progressive pressure build-up within the tank, the two opposite sides of the reaction piston effectively neutralize one another to produce a net resultant force of zero in both the valve opening and valve retaining directions, so that the poppet valve is under the retaining influence only of the biasing spring at that time. By making access to the underside of the reaction piston difficult for liquid in the tank, however, the neutralizing effect of the underside of the reaction piston is temporarily prevented during a sudden liquid surge so that the top working surface of the reaction piston is effective in keeping the poppet valve closed at this time. Once the pressurized liquid is successful in gaining access to the undersigned of the reaction piston so as to neutralize the force exerted on the top working surface of the piston, the poppet valve may be opened if the pressure exerted against it exceeds the predetermined level.

In order to restrict access to the underside of the reaction piston by the surging liquid in the event of a rollover, a restricted arrangement of inlet ports is provided in communication with the underside of the reaction piston. Although gaseous vapor can progressively find its way into the neutralizing chamber that is defined beneath the underside of the reaction piston as pressure in the tank progressively builds up during a normal need-to-vent situation, instantaneous access to the neutralizing chamber by surging liquid is prevented by the restricted port arrangement. Moreover, because of the presence of gas in the neutralizing chamber just prior to the liquid surge, the liquid which would seek to enter the neutralizing chamber must first compress the gas in order to do so, thereby further inhibiting quick access to the underside of the reaction piston by the surging liquid.

DETAILED DESCRIPTION

Figure 1:
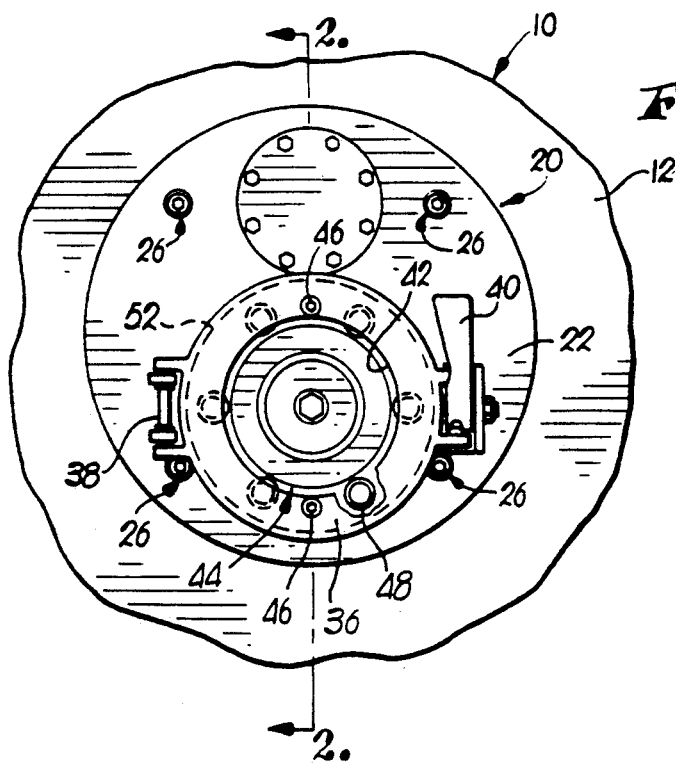
FIG. 1 is a fragmentary, top plan view of a cargo tank having a relief valve in accordance with the present invention attached to the manhole cover assembly associated with the tank.

The cargo tank 10 has a top wall 12 that is provided with a manhole 14 defined by a cylindrical collar 16 fixed to the top wall 12. The upright collar has a rim portion 16a that projects a short distance above the surface of the top wall 12, while a lower depending portion 16b of the collar 16 projects downwardly into the interior 18 of the tank 10.

Figure 3:
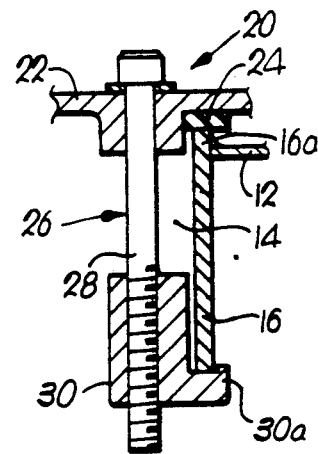
FIG. 3 is an enlarged, fragmentary cross-sectional view of the means for attaching the manhole cover assembly to the manhole-defining collar on the cargo tank.
Figure 2:
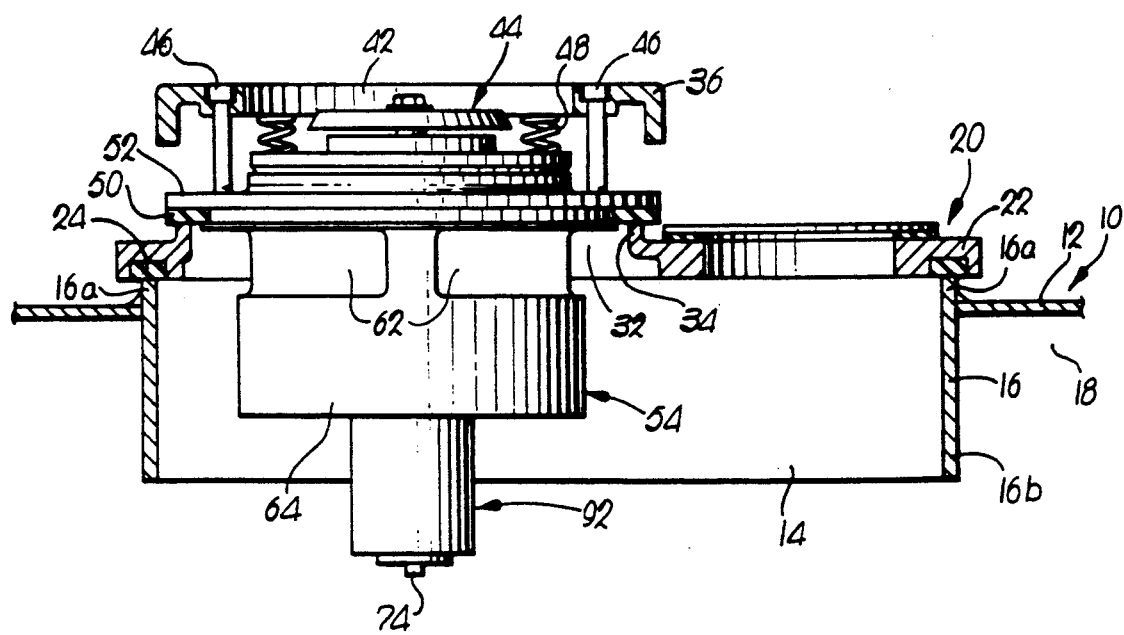
FIG. 2 is a fragmentary, enlarged, vertical cross-section view of the valve and associated manhole structure taken substantially along line 2—2 of FIG. 1.

A manhole cover assembly 20 covers the manhole 14 and includes as its primary component a large circular plate 22 that spans the manhole 14 and rests on top of the rim 16a. As shown in FIGS. 2 and 3, the plate 22 overhangs the rim 16a and has an annular sealing gasket 24 that engages the top edge of the rim 16a to make a liquid-tight seal with the collar 16 at that point.

As illustrated in FIG. 3, the manhole cover assembly 20 is detachably secured to the collar 16 via a plurality of bolt assemblies 26, each of which includes a bolt 28 having a lower threaded end and a nut 30 threadably received on such lower end. Each nut 30 has an out-turned hook portion 30a that catches under the lowermost edge of the collar 16 as the nut 30 is drawn up onto the bolt 28, thus securing the manhole cover assembly 20 in place.

The cover plate 22 has a fill opening 32 defined therein by an upstanding circular rim 34. The fill opening 32 is sealed by a lid 36 having a hinged connection with the plate 22 at 38 so that the lid 36 can be swung between the closed position illustrated in FIG. 1 and an open position in which the fill opening 32 is exposed for access purposes. A releasable latch 40 having components on the plate 22 and the lid 36 respectively may be utilized to snugly secure the lid 36 in its closed position.

The lid 36 is of annular configuration, presenting a central aperture 42 within which is disposed a relief valve assembly 44 constructed in accordance with the present invention. A pair of diametrically opposed mounting screws 46 pass through the lid 36 for securing the valve assembly 44 to the lid 36 beneath the latter. It will be noted that the screws 46 are slidably received within the lid 36 but are fixedly secured to the valve assembly 44 such that the assembly 44 can move yieldably up and down relative to the lid 36 against the force of six coil springs 48 spaced around the aperture 42 at 60° intervals. In this way, an annular sealing gasket 50 on the underside of a flange 52 of the valve assembly 44 is pressed yieldably against the rim 34 when the lid 36 is latched down in its closed position of FIG. 1 and FIG. 2.

Figure 4:
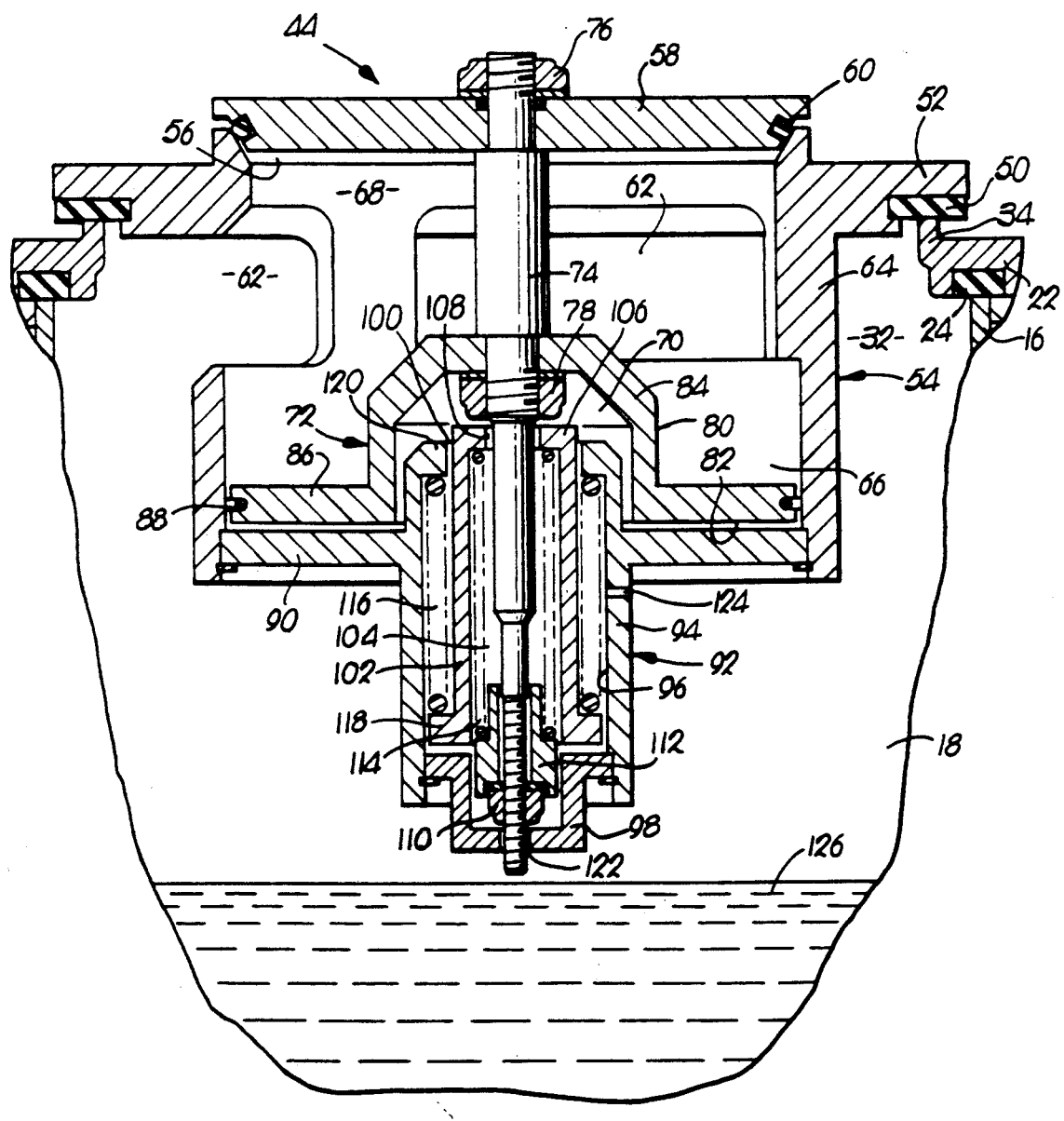
FIG. 4 is a further enlarged, fragmentary vertical cross-sectional view through the valve assembly itself showing the poppet valve in its closed position.
Figure 5:
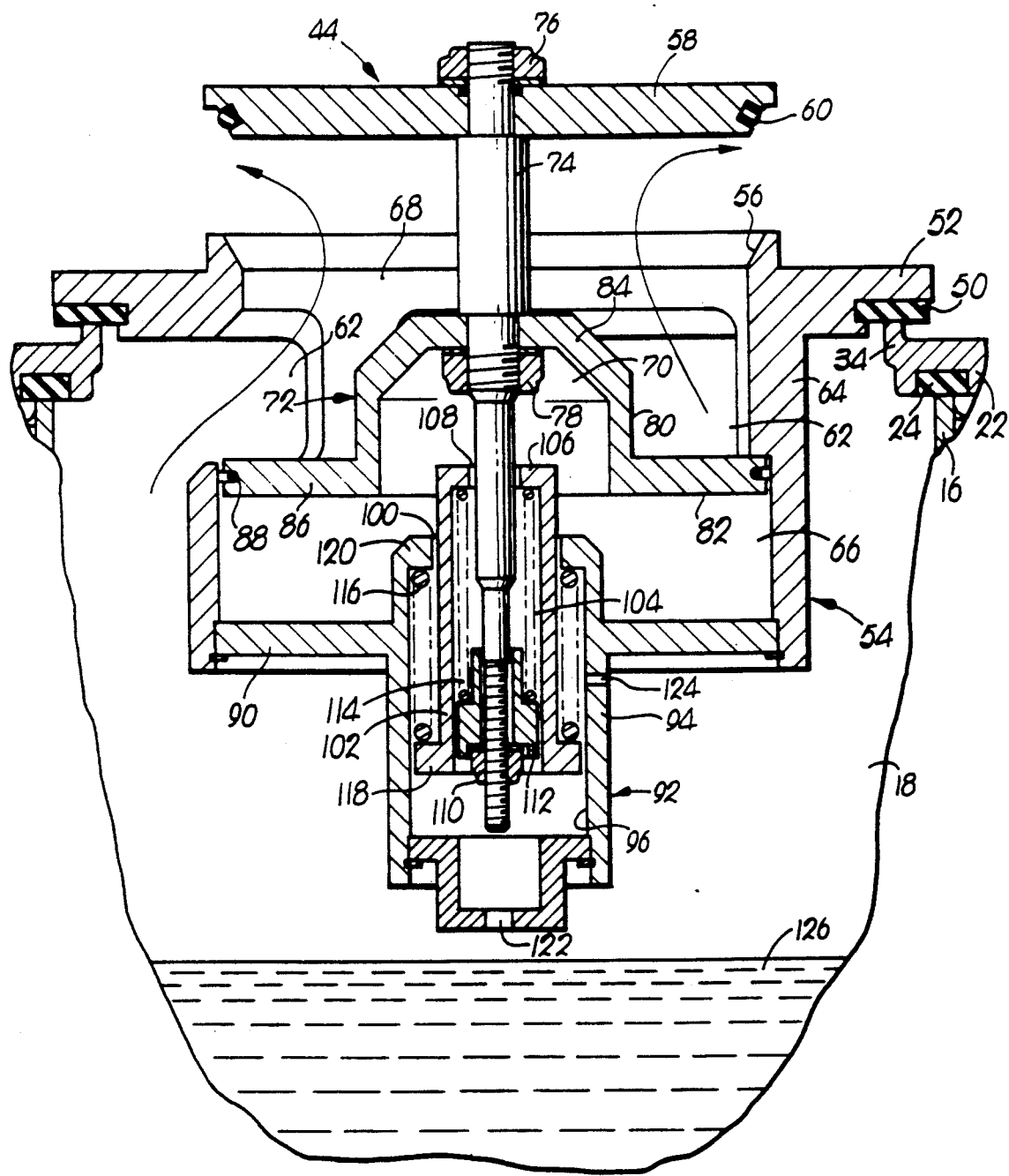
FIG. 5 is a fragmentary cross-sectional view of the valve assembly similar to FIG. 4, but showing the poppet valve in its open position.

With particular reference to FIGS. 4 and 5, it will be seen that the relief valve assembly 44 includes a hollow valve body 54 of generally cylindrical configuration having the flange 52 adjacent its upper end. Most of the valve body 54 hangs down into the interior 18 of the tank, such that only a relatively small, low profile upper portion projects beyond the rim 34 of the fill opening 32. The upper end of the valve body 54 is open so as to define a venting outlet 56 under the control of a poppet valve 58. The poppet valve 58 is movable between the closed position illustrated in FIG. 4 and the open position illustrated in FIG. 5, there being an O-ring gasket 60 around the beveled peripheral edge of the poppet 58 that seats against the correspondingly beveled surface of the outlet 56 when poppet valve 58 is closed.

The valve body 54 has a series of lateral inlets 62 formed in a sidewall 64 thereof (see also FIG. 2) which serve to communicate the interior 18 of the tank with an elongated, inner bore 66 defined within the valve body 54 by the side wall 64. The bore 66 is subdivided into an upper reaction chamber broadly denoted by the numeral 68 disposed immediately below the poppet valve 58, and a lower neutralizing chamber 70 disposed beneath a reaction piston 72 which is vertically reciprocable within the bore 66. The lateral inlets 62 open into the reaction chamber 68 such that both the underside of the poppet valve 58 and the top side of the reaction piston 72 are simultaneously exposed to pressure from the interior 18 of the tank, whether in the form of gaseous pressure or surging liquid pressure. Thus, the reaction chamber 68 in a sense serves as a form of passage means which simultaneously communicate both the poppet valve 58 and the reaction piston 72 with the interior of the tank via the inlets 62.

The poppet valve 58 has a centrally disposed, axial stem 74 to which it is securely attached by a nut 76 threaded onto the upper end of the stem 74. The stem 74 also fixedly carries the reaction piston 72 at a location spaced below the poppet 58 so that the reaction piston 72 and the poppet 58 move together during opening the closing of the poppet 58. A nut 78 on the bottom side of the piston 72 is threaded onto a central threaded portion of the stem 74 to securely attach the piston 72 into a permanent location on the stem 74 relative to the poppet 58.

The reaction piston 72 has an upper working surface 80 exposed to the chamber 68, and a lower neutralizing surface 82 exposed to the neutralizing chamber 70. The two surfaces 80, 82 have equal surfaces areas and are configured to produce a central dome-like hub 84 in the piston as well as a flat, radially outwardly extending web 86 at the lower margin of the hub 84. The web 86 has a sealing O-ring 88 around its outermost periphery that wipes against the interior surface of the side wall 64 so as to sealingly separate the chambers 68 and 70 from one another.

The lower end of the bore 66 is closed by a transverse bottom wall 90 having a centrally disposed, elongated, cylindrical spring housing 92 secured thereto and projecting in opposite upward and downward directions from the bottom wall 90. The cylindrical spring housing 92 has an outer annular side wall 94 that defines an internal, cylindrical spring chamber 96 which is closed at its bottom end by a generally transversely U-shaped closure 98. The opposite, upper end of the spring housing 92 has a centrally disposed clearance hole 100 which telescopically receives an inverted, elongated spring cup 102 having its own internal spring chamber 104. An top transverse wall 106 of the spring cup 102 has a central opening 108 therein which telescopically receives the lower, reduced diameter half of the stem 74. The lowermost end of the stem half is threaded so as to receive a nut 110 thereon which bears against a spring seat 112 encircling the lower half of the stem 74 just above the nut 110. Consequently, a coil compression spring 114 is trapped within the spring chamber 104 between the seat 112 and the top wall 106 to yieldably bias the poppet valve 58 downwardly toward its closed position of FIG. 4.

Assisting the coil spring 114 in this respect is a second, larger diameter coil compression spring 116 that encircles the spring cup 102 and is trapped between a lower radial flange 118 on the spring cup 102 and an upper transverse wall 120 of the spring housing 92 within which the clearance hole 100 is defined. The spring rates of the two springs 114,116 are substantially identical to one another. As a consequence of this construction, the springs 114,116 are disposed in a series arrangement such that the effective spring rate of the resulting combination is cut in half. For a given amount of total opening force, this causes the poppet 58 to open twice as far as it otherwise would with only one of the springs 114 or 116 in use.

The closure 98 at the bottom end of the spring housing 92 has a centrally disposed clearance hole 122 that telescopically receives the lower threaded end of the stem 74. There is complete clearance between the walls of the hole 122 and the threads of the stem 74 so that stem 74 does not wipe against the walls of the hole 122 during reciprocation of the stem 74.

The sidewall 94 of the spring housing 92 has a port 124 therethrough which communicates the interior of the tank 18 with the spring chambers 96 and 104, which in turn communicate with the neutralizing chamber 70 via the clearance hole 100 and the central opening 108. It will be appreciated that due to the presence of the clearance hole 122 for stem 74 in the closure 98, pressurized gas and liquid within the tank interior 18 also have access to the spring chambers 96 and 104 via the clearance hole 122, although it is contemplated that access through the clearance hole 122 will be considerably less than that through the port 124. Consequently, the clearance hole 122, the port 124, the chambers 96 and 104, and the hole 100 with the central opening 108 broadly comprise restricted access means to the neutralizing chamber 70 for pressurized gas and liquid within the tank interior 18.

Operation

FIGS. 4 and 5 illustrate the valve assembly 44 under normal operating conditions. As illustrated in FIG. 4, the poppet valve 58 is normally maintained in a closed condition with the O-ring gasket 60 seated firmly against the beveled rim of the venting outlet 56. This is due to the fact that unless the pressure within the reaction chamber 68 exceeds a certain predetermined maximum level, the retaining force generated by the two springs 114 and 116 is greater than the pressure exerted against the underside of the poppet valve 58.

When the cargo tank 10 is upright, as illustrated in FIGS. 4 and 5, the gas vapors within the interior of the tank 18 enter the reaction chamber 68 via the lateral inlets 62 and also enter the neutralizing chamber 70 via the port 124 and, to a certain extent, the clearance hole 122. Thus, the underside of the poppet valve 58, the top working surface 80 of the reaction piston 72, and the bottom neutralizing surface 82 of the reaction piston 72 are all simultaneously exposed to whatever pressure may exist within the empty space above the volatile liquid 126 within the tank 10. Inasmuch as the surface areas of the working surface 80 and the neutralizing surface 82 are identical to one another, there is no net force created by pressurized vapors in either direction along the axis of the stem 74 from the reaction piston 72. Thus, the valve 58 stays closed solely by the action of the biasing springs 114 and 116 at this time.

In the event the pressure level within the space above the liquid 126 progressively increases due to a heat buildup or otherwise, such buildup will be rather gradual so that it is simultaneously communicated to the underside of poppet 58, the top working surface 80 of reaction piston 72, and the bottom neutralizing surface 82 of the reaction piston 72. Consequently, even during the gradual gaseous pressure buildup, the effect of the reaction piston 72 is neutralized and the poppet valve 58 remains closed so long as the force pushing outwardly against the bottom of the poppet 58 does not exceed the counteracting biasing force of the springs 114 and 116. Once that level is exceeded, however, the poppet valve 58 is unseated, as illustrated in FIG. 5, allowing the gas to be vented to the atmosphere. Once sufficient venting has occurred to bring the opening force below the retaining force of the springs the valve 58 recloses and the interior of the tank 18 is once again sealed.

Figure 6:
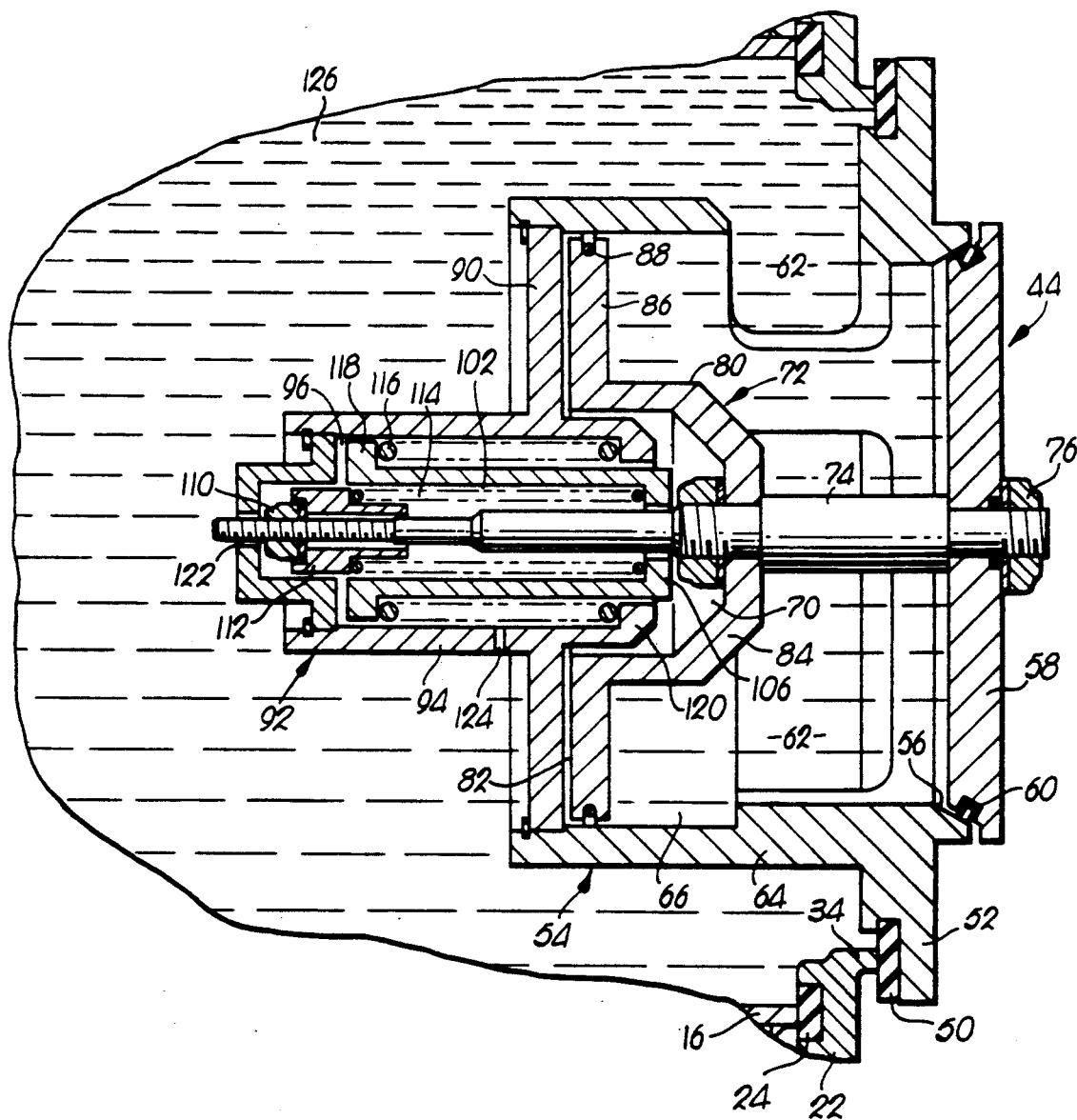
FIG. 6 is a fragmentary cross-sectional view of the valve assembly similar to FIGS. 4 and 5 but illustrating the condition of things during a sudden liquid surge during rollover of the tank.

In the event of a roll over, as illustrated in FIG. 6, there will be a sudden surge by the liquid 116 against parts of the valve assembly 44 as the tank strikes the ground. As illustrated in FIG. 6, the liquid 126 simultaneously bears against the underside of the poppet valve 58 and the top working surface 80 of the reaction piston 72 at that instant. However, due to the fact that access to the neutralizing chamber 70 is limited by the restricted nature of the port 124 and the clearance hole 122, the liquid 126 is unable to reach the underside 82 of the reaction piston 72 simultaneously with the liquid reaching poppet valve 58 and the top side 80 of reaction piston 72. Consequently, there is a net increase in the force retaining the poppet valve 58 closed, such force increase being derived from the liquid bearing against the top surface 80 of the reaction piston 72. The force tending to open the poppet 58, i.e., the liquid bearing against the bottom of the poppet 58, is thus fully counteracted by liquid against the top surface of reaction piston 72, and the poppet valve 58 remains closed during this instant of time.

After a short delay, the liquid gains access to the neutralizing chamber 70, but by this time the pressure spike caused by the sudden surge will have dissipated so that while the forces operating against opposite surfaces 80 and 82 of the reaction piston 72 cancel out one another, there may no longer be a high enough pressure exerted against the bottom of the poppet valve 58 to overcome the resistance of springs 114 and 116. Consequently, the poppet 58 will remain closed. However, if the pressure level within the tank should rise sufficiently in a progressive manner such as if the tank 10 is subjected to a fire, the poppet valve 58 will open to vent the contents to the atmosphere instead of allowing pressure to reach untoward levels within the interior 18.

The duration of a sudden surge in the event of roll over of the tank is in the neighborhood of 60 milliseconds. Thus, only a very short delay in opening of the poppet valve 58 is required in order to provide the necessary sudden surge protection. In the present invention, such protection is provided without any moving parts or pilot-operated mechanisms that must first respond to either the sudden surging pressure or to the effect of gravity in order to prevent opening of the poppet valve. Instead, in the present invention, there is a direct hinderance applied against the surging liquid itself for an instant of time so that the very same medium attempting to force open the relief valve is itself prevented from reaching the area necessary to accomplish its purpose. Consequently, without intermediate, moving parts to fail, the present invention with its uncomplicated, straight-forward design is subject to greater reliability and longer life than certain of the prior art mechanisms.

The total cross-sectional size selected for the inlet port presented by the port 124 and the clearance hole 122 depends upon the duration of the surge protection desired and the level of surge pressure selected to be protected against. It is assumed, of course, that the greatest restriction to liquid flow into the neutralizing chamber 70 is found at the port 124 and the clearance hole 122, rather than at the clearance hole 100 and the central opening 108. Thus, in all cases, the clearance hole 100 and the central opening 108 are designed to provide less restriction to flow than the port 124 and the clearance hole 122.

In order to calculate the cross-sectional size of the port 124 and the annular space within the hole 122 around the valve stem 74, the compressible gas formula $P_1V_1=P_2V_2$ is utilized, where $P_1$ equals the starting pressure within the neutralizing chamber 70, $V_1$ equals the starting volume of gas at the starting pressure, $P_2$ equals the surge pressure to be kept from entering the neutralizing chamber 70, and $V_2$ equals the final volume of the gas trapped within the neutralizing chamber 70 at surge pressure. Since $P_1$, $V_1$, and $P_2$ are known quantities, the equation can be solved for $V_2$, and then the change in volume can be calculated, which will provide a volume differential equal to the volume of liquid which would need to enter the neutralizing chamber 70 at the surge pressure before the pressure on both sides of the reaction piston would be equal and the effect of the reaction piston 72 would thus be neutralized.

Once the volume of liquid necessary to enter the chamber 70 is known, the flow rate can be calculated in gallons per minute (GPM) when a value for duration of time of the surge is applied. Thereupon, the standard formula for calculating orifice size can be utilized, i.e., $GPM = 29.836 \ CD^2\sqrt{P}$, where GPM equals the flow rate in gallons per minute, C equals a constant for a sharp-edged orifice (0.62), D equals the diameter in inches of the orifice being calculated, and P equals the pressure change in pounds per square inch.

In a preferred embodiment of the present invention, certain values were established for the cross-sectional inlet port size based upon an assumed standard which required maintaining the poppet valve 58 closed during a surge pressure of 30 psi lasting for 60 milliseconds. In order to over-design the unit to provide even increased protection beyond the assumed standard, values were determined based upon holding a 30 psi surge for 300 milliseconds.

The reduced to practice unit had a poppet valve 58 with a working underside surface area of 25.36 sq. inches. The upper and lower surfaces 80 and 82 of the reaction piston were each provided with a surface area of 30.08 sq. inches. This yielded an area ratio of 1.19 to 1.

With the volume of the neutralizing chamber assumed to be 10.75 cubic inches when the poppet valve 58 was closed, the above noted formulas yielded a total port or orifice diameter of 0.181 inches.

This construction yielded a relief valve that would open at $3\frac{1}{2}$ psi above atmospheric pressure, yet would maintain the poppet valve 58 fully closed for a duration far exceeding 60 milliseconds at an assumed surge pressure of 30 psi.

It will be noted that by virtue of the present design, there is a low exterior profile presented by the valve assembly 44. Most of the valve assembly 44 projects down into the interior of the tank 18, rather than up above the exterior thereof. Furthermore, the interior of the valve assembly is completely shielded from adverse weather conditions when the poppet 58 is closed, in contrast to some prior art devices. Consequently, moisture is kept from entering the valve, collecting in low spots, and freezing up the parts, rendering the valve inoperable.

Moreover, the design as disclosed herein provides relatively high capacity venting ability within a given hole size in the lid 36. It will be noted in this respect that as the poppet valve 58 rises off the outlet seat 56, there is a complete, uncluttered discharge area that allows escape of pressurized gas. This is true for the full 360° circumference of the valve 58, thus increasing the volume of gas per unit time which can be discharged.

The series arrangement of the compression springs 114,116 provides for an increased amount of poppet valve travel when an opening force is applied, thus assuring maximum venting capacity. Consequently, the advantageous effect of a single, long compression spring with a low spring rate is obtained without the dimensional disadvantages inherent in such a longer spring.

Additionally, it will be noted that the relief valve of the present invention may be easily retrofitted onto existing tankers provided with manholes in their top wall. The present invention may be embodied in a valve assembly 44 itself, as part of a replacement fill lid assembly, or as part of an entire manhole cover assembly to be fastened onto the pre-existing manhole in the tank.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

I claim:

1. In a pressure relief valve assembly for volatile liquids having a discharge outlet, discharge passage means communicating with said outlet, a valve shiftable by pressure buildup in said passage means from a closed position closing the outlet to an open position opening the outlet, and means for yieldably biasing the valve toward said closed position to maintain the valve normally closed, improved sudden surge protection apparatus for the assembly comprising:

a reaction piston movable with the valve and having a working surface exposed to said passage means simultaneously with the valve in a disposition for counteracting the tendency of a sudden surge of liquid to open the valve;

a neutralizing surface operably associated with said reaction piston for exposure to gaseous pressure buildup simultaneously with the working surface of the piston in a disposition for counteracting the effect of the working surface of the reaction piston during such gaseous pressure buildup; and restricted access means communicating said neutralizing surface with the exterior of the assembly in a manner to delay access to the neutralizing surface by a sudden liquid surge while permitting said simultaneous exposure of the working surface and the neutralizing surface to gradual gaseous pressure buildup whereby to protect the valve against opening during a sudden liquid surge, said valve having an operating surface operably associated therewith which has a fixed amount of surface area in communication with said passage means for causing the valve to shift to said open position when pressure buildup against the operating surface exceeds a certain predetermined level, said neutralizing surface of the reaction piston having the same amount of exposed surface area in both the open and closed positions of the valve.

2. In a pressure relief valve assembly as set forth in claim 1,
said neutralizing surface comprising part of said piston.

3. In a pressure relief valve assembly as set forth in claim 2,
said piston having a pair of oppositely directed faces with respect to the path of travel of the piston during movement between its open and closed positions,
said surfaces being on opposite ones of said faces.

4. In a pressure relief valve assembly as set forth in claim 1,
said restricted access means including port means dimensioned to limit the volume of surging liquid that can reach said neutralizing surface of the reaction piston within a predetermined amount of time.

5. In a pressure relief valve assembly as set forth in claim 1,
said assembly further including a hollow body provided with an internal bore which has said outlet at one end thereof and an outer wall having lateral inlets therein for communicating the bore with the ambient pressure of the interior of the tank,
said valve having an axially extending stem secured thereto,
said reaction piston being secured to the stem in spaced relation to the valve for defining a working pressure chamber therebetween which is in continuous communication with the interior of the tank via said lateral inlets,
said working pressure chamber comprising said passage means, and said working surface of the piston comprising a working face of the piston exposed to the working pressure chamber,
said body including an inner end wall remote from said outlet, defining an inner end of the bore, and defining at least a portion of said restricted access means,
said piston cooperating with the end wall to define a neutralizing pressure chamber therebetween which is in constant communication with the interior of the tank via said restricted access means,
said neutralizing surface of the piston comprising a neutralizing face of the piston directed oppositely from said working face and exposed to the neutralizing chamber.

6. In a pressure relief valve assembly for volatile liquids having a discharge outlet, discharge passage means communicating with said outlet, a valve shiftable by pressure buildup in said passage means from a closed position closing the outlet to an open position opening the outlet, and means for yieldably biasing the valve toward said closed position to maintain the valve normally closed, improved sudden surge protection apparatus for the assembly comprising:

a reaction piston movable with the valve and having a working surface exposed to said passage means simultaneously with the valve in a disposition for counteracting the tendency of a sudden surge of liquid to open the valve;

a neutralizing surface operably associated with said reaction piston for exposure to gaseous pressure buildup simultaneously with the working surface of the piston in a disposition for counteracting the effect of the working surface of the reaction piston during such gaseous pressure buildup; and restricted access means communicating said neutralizing surface with the exterior of the assembly in a manner to delay access to the neutralizing surface by a sudden liquid surge while permitting said simultaneous exposure of the working surface and the neutralizing surface to gradual gaseous pressure buildup whereby to protect the valve against opening during a sudden liquid surge, said body further including a generally cylindrical spring housing projecting outwardly from said end wall, said stem projecting beyond said reaction piston and into said housing, said yieldable biasing means including coil spring means contained within said housing and coupled with said stem in a manner to yieldably urge to the valve toward its closed position, said assembly further including a hollow body provided with an internal bore which has said outlet at one end thereof and an outer wall having lateral inlets therein for communicating the bore with the ambient pressure of the interior of the tank, said valve having an axially extending stem secured thereto, said reaction piston being secured to the stem in spaced relation to the valve for defining a working pressure chamber therebetween which is in continuous communication with the interior of the tank via said lateral inlets, said working pressure chamber comprising said passage means, and said working surface of the piston comprising a working face of the piston exposed to the working pressure chamber, said body including an inner end wall remote from said outlet, defining an inner end of the bore, and defining at least a portion of said restricted access means, said piston cooperating with the end wall to define a neutralizing pressure chamber therebetween which is in constant communication with the interior of the tank via said restricted access means, said neutralizing surface of the piston comprising a neutralizing face of the piston directed oppositely from said working face and exposed to the neutralizing chamber, said body further including a generally cylindrical spring housing projecting outwardly from said end wall, said stem projecting beyond said reaction piston and into said housing, said yieldable biasing means including coil spring means contained within said housing and coupled with said stem in a manner to yieldably urge to the valve toward its closed position.

7. In a pressure relief valve assembly as set forth in claim 6,
said spring housing having port means therein comprising at least a portion of said restricted access means,
said housing including a sidewall and said port means including a port in said sidewall.

8. In a pressure relief valve assembly as set forth in claim 7,
said spring housing including a transverse end wall having an opening that comprises a portion of said port means,
said stem being disposed to restrict flow into the housing through the opening when the valve is closed and to diminish the amount of restriction through the opening when the valve is opened.

9. In a pressure relief valve assembly as set forth in claim 6,
said coil spring means including a pair of concentrically disposed coil compression springs operably coupled with one another in a series relationship to reduce the effective spring rate of the coil spring means.

10. In a manhole cover assembly for attachment to the wall of a storage tank having an manhole therein, the improvement comprising:
a cover plate adapted to span said manhole when the assembly is attached to the tank;
means for releasably securing the plate on the tank in spanning relationship to said manhole;
a fill opening in said plate;
lid hingedly secured to said plate for swinging movement between positions opening and closing said fill opening;
releasable latch means on the lid and the plate for releasably securing the lid in its position closing the fill opening;
an aperture in said lid disposed for alignment with the fill opening when the lid is in its position closing the fill opening; and
a pressure relief valve assembly secured to said lid and received within said aperture for venting the interior of the tank to the atmosphere in the event of a gaseous pressure buildup within the tank beyond a certain predetermined level,
said valve assembly including:
a discharge outlet;
discharge passage means communicating with said outlet;
a valve shiftable by gaseous pressure buildup in said passage means from a closed position closing the outlet to an open position opening the outlet;
means for yieldably biasing the valve toward said closed position to maintain the valve normally closed;
a reaction piston movable with the valve and having a working surface exposed to said passage means simultaneously with the valve in a disposition for counteracting the tendency of a sudden surge of liquid to open the valve;
a neutralizing surface operably associated with said reaction piston for exposure to gaseous pressure buildup simultaneously with the working surface of the piston in a disposition for counteracting the effect of the working surface of the reaction piston during such gaseous pressure buildup; and
restricted access means communicating said neutralizing surface with the exterior of the assembly in a manner to delay access to the neutralizing surface by a sudden liquid surge while permitting said simultaneously exposure of the working surface and the neutralizing surface to gradual gaseous pressure buildup whereby to protect the valve against opening during a sudden liquid surge.

11. In a manhole cover assembly as set forth in claim 10,
said neutralizing surface comprising part of said piston.

12. In a manhole cover assembly as set forth in claim 11,
said piston having a pair of oppositely directed faces with respect to the path of travel of the piston during movement between its open and closed positions,
said surfaces being on opposite ones of said faces.

13. In a manhole cover assembly as set forth in claim 10,
said restricted access means including port means dimensioned to limit the volume of surging liquid that can reach said neutralizing surface of the reaction piston within a predetermined amount of time.

14. In a manhole cover assembly as set forth in claim 10,
said assembly further including a hollow body provided with an internal bore which has said outlet at one end thereof and an outer wall having lateral inlets therein for communicating the bore with the ambient pressure of the interior of the tank,
said valve having an axially extending stem secured thereto,
said reaction piston being secured to the stem in spaced relation to the valve for defining a working pressure chamber therebetween which is in continuous communication with the interior of the tank via said lateral inlets,
said working pressure chamber comprising said passage means, and said working surface of the piston comprising a working face of the piston exposed to the working pressure chamber,
said body including an inner end wall remote from said outlet, defining an inner end of the bore, and defining at least a portion of said restricted access means,
said piston cooperating with the end wall to define a neutralizing pressure chamber therebetween which is in constant communication with the interior of the tank via said restricted access means,
said neutralizing surface of the piston comprising a neutralizing face of the piston directed oppositely from said working face and exposed to the neutralizing chamber.

15. In a manhole cover assembly as set forth in claim 14,
said body further including a generally cylindrical spring housing projecting outwardly from said end wall,
said stem projecting beyond said reaction piston and into said housing,
said yieldable biasing means including coil spring means contained within said housing and coupled with said stem in a manner to yieldably urge to the valve toward its closed position.

16. In a manhole cover assembly as set forth in claim 15,
said spring housing having port means therein comprising at least a portion of said restricted access means,
said housing including a sidewall and said port means including a port in said sidewall.

17. In a manhole cover assembly as set forth in claim 16,
said spring housing including a transverse end wall having an opening that comprises a portion of said port means,
said stem being disposed to restrict flow into the housing through the opening when the valve is closed and to diminish the amount of restriction through the opening when the valve is opened.

18. In a manhole cover assembly as set forth in claim 15,
said coil spring means including a pair of concentrically disposed coil compression springs operably coupled with one another in a series relationship to reduce the effective spring rate of the coil spring means.

19. In a cargo tank for volatile liquids, the improvement comprising:
a tank wall;
an aperture in said wall; and
a pressure relief valve assembly mounted on said wall and received within said aperture for venting the interior of the tank to the atmosphere in the event of a gaseous pressure buildup within the tank beyond a certain predetermined level,
said valve assembly including:
a discharge outlet;
discharge passage means communicating with said outlet;
a valve shiftable by gaseous pressure buildup in said passage means from a closed position closing the outlet to an open position opening the outlet;
means for yieldably biasing the valve toward said closed position to maintain the valve normally closed;
a reaction piston movable with the valve and having a working surface exposed to said passage means simultaneously with the valve in a disposition for counteracting the tendency of a sudden surge of liquid to open the valve;
a neutralizing surface operably associated with said reaction piston for exposure to gaseous pressure buildup simultaneously with the working surface of the piston in a disposition for counteracting the effect of the working surface of the reaction piston during such gaseous pressure buildup; and
restricted access means communicating said neutralizing surface with the exterior of the assembly in a manner to delay access to the neutralizing surface by a sudden liquid surge while permitting said simultaneously exposure of the working surface and the neutralizing surface to gradual gaseous pressure buildup whereby to protect the valve against opening during a sudden liquid surge.

20. In a cargo tank as set forth in claim 19,
said neutralizing surface comprising part of said piston.

21. In a cargo tank as set forth in claim 20,
said piston having a pair of oppositely directed faces with respect to the path of travel of the piston during movement between its open and closed positions,
said surfaces being on opposite ones of said faces.

22. In a cargo tank as set forth in claim 19,
said restricted access means including port means dimensioned to limit the volume of surging liquid that can reach said neutralizing surface of the reaction piston within a predetermined amount of time.

23. In a cargo tank as set forth in claim 19,
said assembly further including a hollow body provided with an internal bore which has said outlet at one end thereof and an outer wall having lateral inlets therein for communicating the bore with the ambient pressure of the interior of the tank,
said valve having an axially extending stem secured thereto,
said reaction piston being secured to the stem in spaced relation to the valve for defining a working pressure chamber therebetween which is in continuous communication with the interior of the tank via said lateral inlets,
said working pressure chamber comprising said passage means, and said working surface of the piston comprising a working face of the piston exposed to the working pressure chamber,
said body including an inner end wall remote from said outlet, defining an inner end of the bore, and defining at least a portion of said restricted access means,
said piston cooperating with the end wall to define a neutralizing pressure chamber therebetween which is in constant communication with the interior of the tank via said restricted access means,
said neutralizing surface of the piston comprising a neutralizing face of the piston directed oppositely from said working face and exposed to the neutralizing chamber.

24. In a cargo tank as set forth in claim 23,
said body further including a generally cylindrical spring housing projecting outwardly from said end wall,
said stem projecting beyond said reaction piston and into said housing,
said yieldable biasing means including coil spring means contained within said housing and coupled with said stem in a manner to yieldably urge to the valve toward its closed position.

25. In a cargo tank as set forth in claim 24,
said spring housing having port means therein comprising at least a portion of said restricted access means,
said housing including a sidewall and said port means including a port in said sidewall.

26. In a cargo tank as set forth in claim 25,
said spring housing including a transverse end wall having an opening that comprises a portion of said port means,
said stem being disposed to restrict flow into the housing through the opening when the valve is closed and to diminish the amount of restriction through the opening when the valve is opened.

27. In a cargo tank as set forth in claim 24,
said coil spring means including a pair of concentrically disposed coil compression springs operably coupled with one another in a series relationship to reduce the effective spring rate of the coil spring means.

* * * * *